US006024531A

United States Patent [19]

Schulze

[11] Patent Number: 6,024,531

[45] Date of Patent: Feb. 15, 2000

[54] MANIPULATOR FOR A DEVICE FOR DEPOSITING AND WITHDRAWING BANK NOTES

[75] Inventor: Manfred Schulze, Tulln, Austria

[73] Assignee: AS Beteiligungs Gesellschaft m.b.H., Austria

[21] Appl. No.: 08/652,508

[22] PCT Filed: Dec. 1, 1994

[86] PCT No.: PCT/AT94/00182

§ 371 Date: May 31, 1996

§ 102(e) Date: May 31, 1996

[87] PCT Pub. No.: WO95/15544

PCT Pub. Date: Jun. 8, 1995

[30] Foreign Application Priority Data

Dec. 3, 1993 [AT] Austria .................................... 2459/93

[51] Int. Cl.[7] ...................................................... B25J 15/02

[52] U.S. Cl. ........................... 414/790.2; 901/34; 901/38; 902/14

[58] Field of Search .................................... 414/750, 751, 414/790.2, 790.1, 331.13, 331.18; 902/13, 14, 15; 901/38, 34, 32; 271/292, 299

[56] References Cited

U.S. PATENT DOCUMENTS

| | | | |
|---|---|---|---|
| 3,393,813 | 7/1968 | Luginbuhl | 414/790.2 X |
| 4,385,827 | 5/1983 | Naramore | 271/292 X |
| 4,511,301 | 4/1985 | Kawano et al. | 414/790.2 |
| 4,545,715 | 10/1985 | Seefeldt | 414/790.2 X |
| 4,696,501 | 9/1987 | Webb | 901/34 X |
| 5,000,322 | 3/1991 | Goi | 209/534 |
| 5,250,788 | 10/1993 | Sugai et al. | 235/379 |
| 5,460,359 | 10/1995 | Toyohara et al. | 414/790.2 X |

FOREIGN PATENT DOCUMENTS

| | | |
|---|---|---|
| 0 391 059 | 10/1990 | European Pat. Off. . |
| 2261954 | 9/1975 | France . |
| 1 3917699 | 12/1989 | Germany . |
| 90 01 888 | 5/1990 | Germany . |
| 912 215 | 12/1962 | United Kingdom . |
| 2130778 | 6/1984 | United Kingdom . |

*Primary Examiner*—Janice L. Krizek
*Attorney, Agent, or Firm*—Nixon & Venderhye P.C.

[57] ABSTRACT

A device for depositing and withdrawing banknotes, in which the banknotes are conducted in a closed circuit between deposition and withdrawal is provided which includes an extractable drawer for the sorted reception of banknotes and extractable drawer for the sorted reception of banknotes and for various banknotes in different shafts, from which the respective banknotes can be drawn off mechanically. The device also includes a drawer having an openable bottom and at least one open or openable longitudinal side wall, via which a manipulator can be moved into the respective position in correspondence with the reception bins for individual banknotes. By displacement in the vertical or horizontal direction, the manipulator is able to grasp banknotes and deposit the same in a shaft arranged therebelow, wherein upon reopening of the drawer, only empty reception bins are released, the banknotes having been safely deposited in a safe.

3 Claims, 2 Drawing Sheets

MANIPULATOR FOR A DEVICE FOR DEPOSITING AND WITHDRAWING BANK NOTES

BACKGROUND AND SUMMARY OF THE INVENTION

The invention relates to a manipulator for a device for depositing and withdrawing banknotes, in which the banknotes are conducted in a closed circuit between deposition and withdrawal, the device comprising an extractable drawer for manually inserting various banknotes (i.e., banknotes of different denomination) in different recesses, for the sorted reception of banknotes and for various banknotes in different shafts, from which the respective banknotes can be drawn off mechanically. Automatic machines by which cash money in the form of banknotes can be made to be paid out by using data carriers, such as, for instance, credit or check cards, as well as by inputting a personal code belong to the prior art. Sorting means, banknote identification means and other mechanical aids have been known for receiving banknotes or introducing deposits, which mechanical aids are to prepare and ensure the deposition of paid-in amounts in appropriately secured spaces, such as, for instance, safes.

Usual counters for paying an and out cash money in banks, post offices or other institutions clearly exhibit deficiencies in terms of security that cannot be readily overcome by conventional means. The money offered for deposit usually is locked in safes, which, however, are reopened for withdrawing notes such that there will always be full access to the whole amount of banknotes in store, creating a high safety risk.

Devices that would enable the automatic identification of banknotes and their respective deposition in a sorted order are relatively complex and prone to failures. For, when taking over banknotes not only must the authenticity of the same be verified, but also any damage to genuine banknotes must be recognized so as to cause such banknotes to be withdrawn from circulation. Only undamaged and, of course, only genuine banknotes are to remain in circulation. Considering the banknotes currently in circulation, devices including safety checks (as functionally safe as possible) involve extremely high expenditures.

The invention contemplates a manipulator for a device of the initially defined kind by which the safety risk at counters and cash-in windows, at which amounts of money are also dispensed, is substantially reduced and by which a fully protected circulatory system for banknotes that is not readily accessible from outside is realized in a simple and cost-saving manner. The device has a drawer with an openable bottom and at least one open or openable longitudinal side wall. The manipulator is capable of being moved transverse to the push-in direction of the drawer and is arranged at the openable or open longitudinal side wall. The manipulator comprises at least one gripping means and is movable into a position in correspondence with the respective bin for the banknotes, and upon opening of the bottom of the drawer, is lowerable from that position into the shaft intended to receive said banknotes. The manipulator, upon closing of the bottom of the the drawer and/or closing of the drawer, remains in the reception shaft for the respective banknotes while maintaining a defined pressure. The fact that the device includes a simple drawer having an openable bottom offers the advantage of being able to effect the deposit of banknotes in accordingly provided bins or recesses immediately upon manual pre-sorting, wherein a particularly simple configuration with a view to manipulating the banknotes thus deposited in a sorted manner may be chosen. After having been moved into a safe, the drawer immediately may redisappear in the protected area with the individual bins of the drawer being emptiable in a simple manner such that only empty recesses will be released upon reopening of such a protected area and access to the banknotes withdrawn in a protected manner will no longer be possible. The banknotes thus altogether disappear in the safe after payment and no longer are completely released upon electronically protected opening of the safe. Dispensing of banknotes may be effected in a conventional manner as with conventional bancomats, wherein, again, only that amount is released which has been demanded in each case, access to greater amounts present in the protected zone, in particular in a safe, thus being prevented. On the whole, the configuration comprising a drawer and an openable bottom provides for a structurally particularly simple solution, offering the opportunity for conducting banknotes completely within a protected circulator, system by employing a structurally extremely simple and cost-saving manipulator, thereby substantially reducing any safety risk. By the fact that the responsibility in terms of security check remains with the cashier, new counterfeit money will be taken notice of quickly and the overall expenditures will be substantially reduced.

In a particularly advantageous manner, the configuration according to the invention is devised such that a separate manipulator is provided for any of the various banknotes, and that all of the manipulators are coupled for common movement, thereby considerably reducing expenditures in terms of control and operation of the manipulators. By emptying each individual partial region of the drawer in parallel upon retraction of the drawer and opening of the bottom, it is ensured that after each depositing procedure, only an empty drawer will actually always be made available to new payments, the time involved in emptying the drawer at the same time being substantially reduced. Withdrawing may be effected in parallel with depositing, since the banknotes during depositing are placed on the existing stack from top and during withdrawing are withdrawn from below. Thereby, true simultaneous operation is guaranteed for paying in and out. The use of the manipulators as suggested by the invention in a simple manner also renders it feasible to build up and maintain the necessary application pressure required from automatic banknote dispensing machines with a view to safely withdrawing banknotes. To this end, the configuration according to the invention advantageously is devised such that the manipulator comprises an electric drive motor including a position transmitter connected with a gripper jaw and that a second jaw cooperating with said gripper jaw is kept in its position via an intermediately arranged overload coupling, in particular a magnetic coupling, thus constantly ensuring the correct load and the correct counter pressure in a particularly simple manner and at low structure expenditures.

In a particularly simple manner, the drive motor and the magnetic coupling are connected to a freely programmable control circuit.

In order to ensure that empty reception bins for the banknotes will be opened at each opening of the drawer, the manipulator advantageously is displaceable along two axes.

In the following, the invention will be explained in more detail by way of an exemplary embodiment schematically represented in the drawings.

DETAILED DESCRIPTION OF THE DRAWINGS

Figure 1:
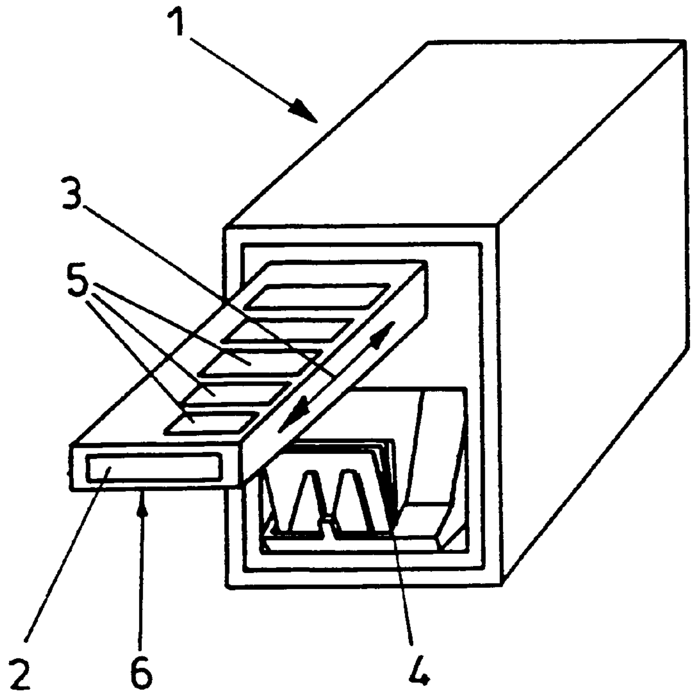
FIG. 1 is a perspective view of a depositing and dispensing machine with the drawer pulled out.

In FIG. 1, a safe 1 is illustrated, in which a pay-in drawer 2 is displacably insertable in the direction of the double arrow 3, i.e., in the longitudinal direction of the drawer. The money dispensing bin is denoted by 4. The pay-in drawer 2 comprises a plurality of recesses or reception bins 5 for receiving various banknotes. During the pay-in procedure, the cashier decides which of the banknotes are to be deemed genuine and are of sufficient quality to remain within the banknotes circulatory system. After the banknotes have been deposited in the reception bins 5 in a sorted manner, the drawer 2 is retracted and the automatic deposit of the banknotes is effected upon opening of the bottom of the drawer 2. The bottom of the drawer 2 is schematically denoted by 6.

Figure 2:
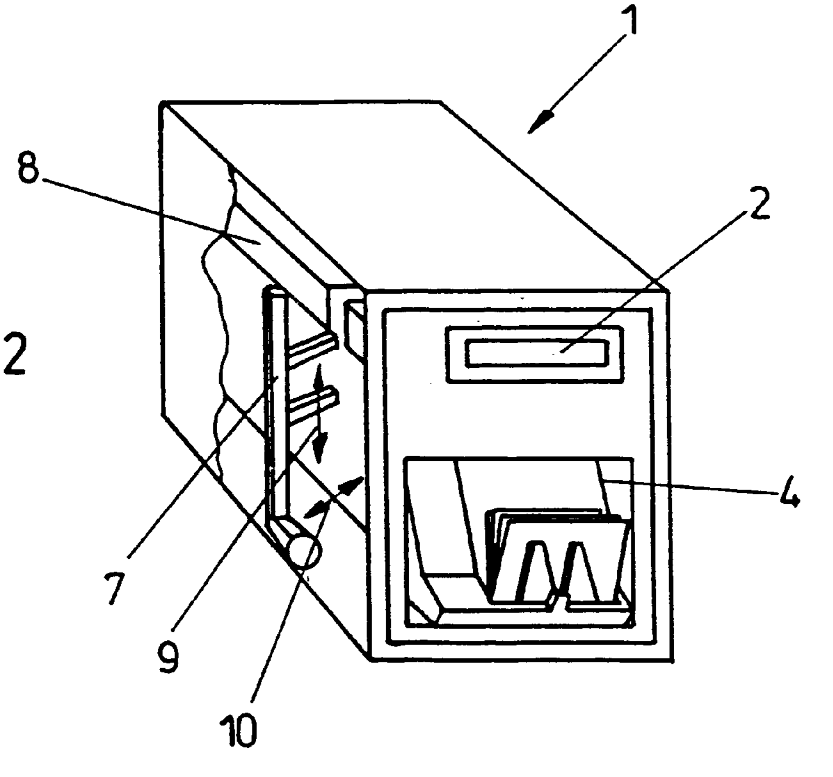
FIG. 2 is a view analogous to FIG. 1 with the pay-in drawer retracted and a partially opened side wall, the gripper and manipulator means being indicated schematically.

In FIG. 2, a manipulator 7 arranged below the retracted pay-in drawer 2 is schematically indicated. The manipulator 7 may be moved to the respective reception bins 5 for the banknotes via a laterally open longitudinal side wall 8 of the retracted drawer 2. The directions of movement of the manipulator are indicated by double arrow 9 in the vertical direction and by 10 in the direction of the laterally open wall of the drawer.

Figure 3:
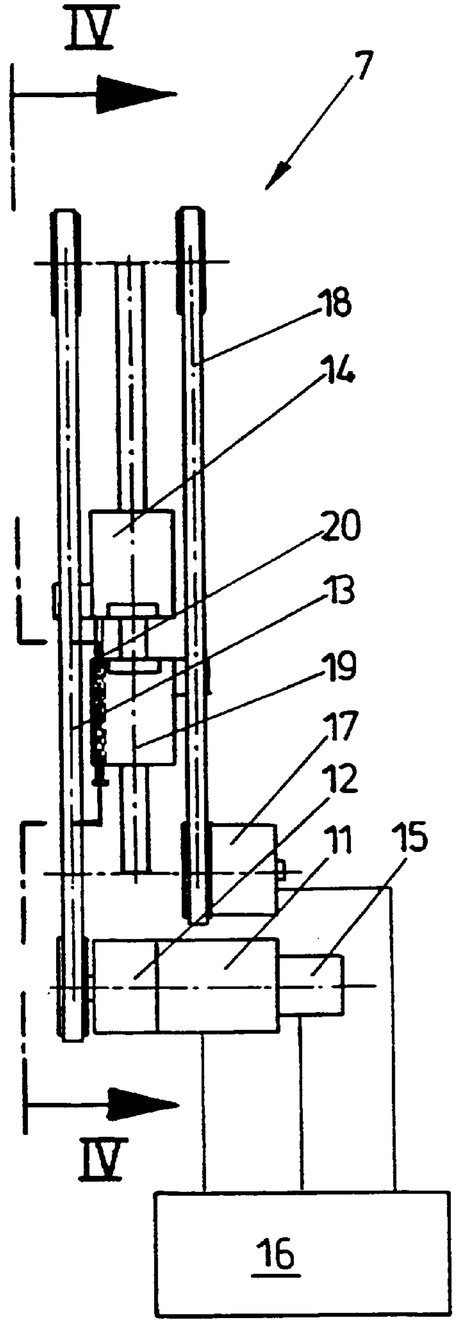
FIG. 3 is a schematic representation of a manipulator for grasping banknotes in the pay-in drawer and depositing the same.

In FIG. 3, the manipulator 7, which has already been indicated schematically in FIG. 2, is explained in more detail. For driving. a drive motor 11 is provided, which is connected with a toothed belt 13 via a transmission 12. A first gripper jaw 14 is connected with the toothed belt and is capable of being displaced in the height direction upon actuation of the drive motor 11. The respective position of the drive motor and hence of the driving jaw 14 is detected by a position transmitter 15, wherein the measured data detected, via signal lines, are connected to a freely programmable control circuit 16, from which also the drive motor 11 is controlled. As a result, the freely programmable control circuit 16 also controls a magnetic coupling 17, which cooperates with a further toothed belt 18, with which a second gripper jaw 19 is, in turn, connected. As the jaw 14 is moved upwards, the jaw 19 is carried along via a carrier pin 20 in the maximally opened position, a stack of banknotes thus being seizable in each bin with the bottom of the drawer 2 opened. After actuation of the drive motor 11 with a view to lowering the jaw 14, the jaw 19 is kept in its position while simultaneously actuating the magnetic coupling 17, and a defined application pressure is safeguarded by the force of the magnetic coupling 17. The total package can be moved downwards by means of the manipulator and deposited in an appropriate shaft, from which the banknotes subsequently can get into the dispensing device and the dispensing bin 4.

Figure 4:
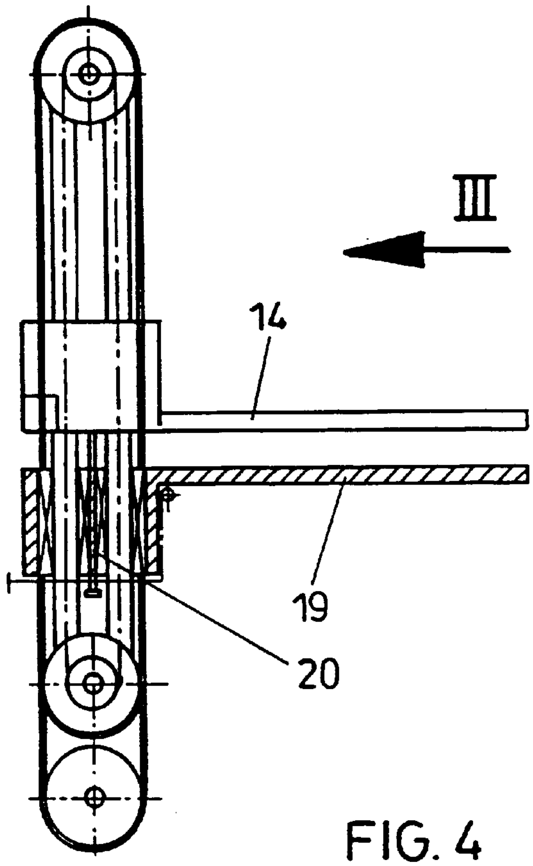
FIG. 4 is a section along line IV—IV of FIG. 3, FIG. 3 being a view in the direction of arrow III of FIG. 4.

In the representation according to FIG. 4, the reference numerals of FIG. 3 have been retained.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A manipulator for a device for depositing and withdrawing banknotes, in which the banknotes are conducted in a closed circuit between receiving bins and a dispensing bin, the device including a reciprocable drawer having a plurality of said receiving bins for receiving manually inserted banknotes in respective ones of said receiving bins from which the respective banknotes can be drawn off mechanically, the manipulator being movable in a direction transverse to a direction of the movement of the reciprocable drawer, said manipulator comprising at least one gripping means movable into a position within a respective one of said receiving bins for engaging the banknotes in said receiving bin and for lowering said banknotes from said receiving bin into a position where said banknotes can be transferred to said dispensing bin, and wherein said gripping means includes first and second pripper jaws, and wherein said manipulator further comprises an electric drive motor including a position transmitter connected with said first gripper jaw, said second gripper jaw cooperating with said first gripper jaw to grasp said banknotes, said second gripper jaw maintained in a gripping position via a magnetic overload coupling.

2. A device according to claim 1 wherein the electric drive motor, position transmitter and the magnetic coupling are connected to a freely programmable control circuit.

3. A device according to claim 1 wherein said manipulator is displaceable in two directions.

* * * * *